United States Patent
Debord

(10) Patent No.: US 9,981,207 B2
(45) Date of Patent: May 29, 2018

(54) POLYMERS USEFUL AS DEMULSIFIERS AND CLARIFIERS

(71) Applicant: BAKER HUGHES INCORPORATED, Houston, TX (US)

(72) Inventor: Justin D. Debord, Katy, TX (US)

(73) Assignee: Baker Hughes, a GE company, LLC, Houston, TX (US)

(*) Notice: Subject to any disclaimer, the term of this patent is extended or adjusted under 35 U.S.C. 154(b) by 363 days.

(21) Appl. No.: 14/250,604

(22) Filed: Apr. 11, 2014

(65) Prior Publication Data

US 2014/0243464 A1  Aug. 28, 2014

Related U.S. Application Data

(63) Continuation-in-part of application No. 13/072,315, filed on Mar. 25, 2011, now abandoned.

(Continued)

(51) Int. Cl.

| | | |
|---|---|---|
| C02F 1/52 | (2006.01) | |
| C02F 1/68 | (2006.01) | |
| B01D 17/04 | (2006.01) | |
| B01D 21/01 | (2006.01) | |
| B03D 3/00 | (2006.01) | |
| E21B 21/06 | (2006.01) | |
| C09K 8/588 | (2006.01) | |
| C08K 5/06 | (2006.01) | |
| C02F 1/00 | (2006.01) | |
| B01D 21/00 | (2006.01) | |
| E21B 21/00 | (2006.01) | |

(Continued)

(52) U.S. Cl.
CPC ........... *B01D 17/047* (2013.01); *B01D 21/01* (2013.01); *C02F 1/52* (2013.01); *C08K 5/06* (2013.01); *C09K 8/588* (2013.01); *E21B 21/068* (2013.01); *C02F 1/02* (2013.01); *C02F 1/68* (2013.01); *C02F 2101/32* (2013.01); *C02F 2103/365* (2013.01); *C02F 2209/02* (2013.01); *C08K 5/01* (2013.01); *C08K 5/053* (2013.01)

(58) Field of Classification Search
None
See application file for complete search history.

(56) References Cited

U.S. PATENT DOCUMENTS 4,120,815 A   10/1978 Raman
4,179,369 A   12/1979 Bradley et al.
(Continued)

FOREIGN PATENT DOCUMENTS

GB           1563957 A    4/1980

*Primary Examiner* — Clare M Perrin
(74) *Attorney, Agent, or Firm* — Mossman, Kumar & Tyler, P.C.

(57) ABSTRACT

A polymer useful as a flocculent, demulsifier or water clarifier may be selected from those having the general formula:

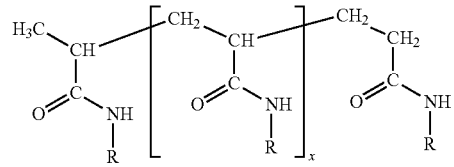

wherein R is an alkyl group having from 3 to about 7 carbons and X is an integer having a value of at least two. The alkyl group may be linear or branched.

14 Claims, 1 Drawing Sheet

Related U.S. Application Data

(60) Provisional application No. 61/324,197, filed on Apr. 14, 2010.

(51) Int. Cl.
  *C09K 8/54* (2006.01)
  *C08K 5/01* (2006.01)
  *C08K 5/053* (2006.01)
  *C02F 103/36* (2006.01)
  *C02F 1/02* (2006.01)
  *C02F 101/32* (2006.01)

(56) References Cited

U.S. PATENT DOCUMENTS

| | | | |
|---|---|---|---|
| 4,343,730 A | | 8/1982 | Becker et al. |
| 4,741,835 A | * | 5/1988 | Jacques ............... B01D 17/047 |
| | | | 210/708 |
| 5,013,452 A | | 5/1991 | Bellos et al. |
| 5,100,582 A | | 3/1992 | Bhattacharyya |
| 5,730,882 A | * | 3/1998 | Gallup ............... B01D 17/0208 |
| | | | 210/666 |
| 5,921,912 A | * | 7/1999 | Hart ................... B01D 17/047 |
| | | | 210/708 |
| 6,020,422 A | | 2/2000 | Connors et al. |
| 6,025,426 A | | 2/2000 | Hurlock |
| 6,190,561 B1 | | 2/2001 | Nagan |
| 6,217,778 B1 | * | 4/2001 | Shing .................. C02F 1/5245 |
| | | | 162/189 |
| 7,470,744 B2 | | 12/2008 | Behles |
| 2013/0228524 A1 | * | 9/2013 | Soderstrom .......... C22B 3/0005 |
| | | | 210/708 |

* cited by examiner

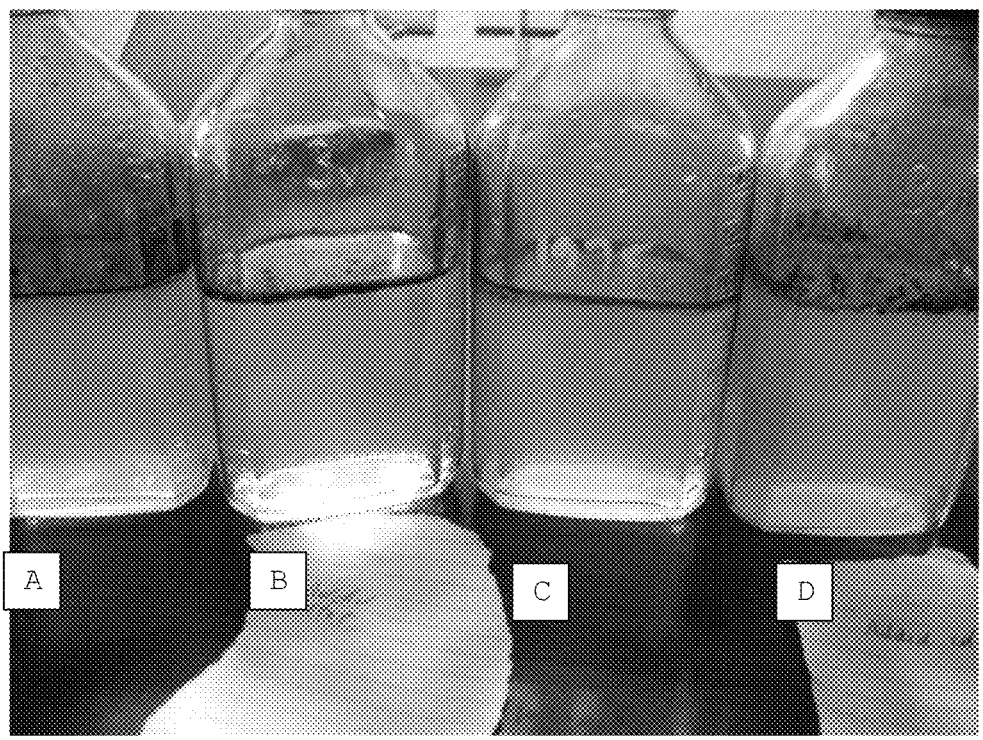

POLYMERS USEFUL AS DEMULSIFIERS AND CLARIFIERS

CROSS REFERENCE TO RELATED APPLICATIONS

This application is a Continuation-in-Part and claims priority to U.S. application Ser. No. 13/072,315 filed on Mar. 25, 2011; which claims priority to U.S. Provisional Application Ser. No. 61/324,197 filed on Apr. 14, 2010; all of which are incorporated by reference herein in their entirety.

FIELD OF THE DISCLOSURE

The invention relates to polymers useful in achieving oil and water separation and water clarification. The invention particularly relates to such polymers that are poly alkylacrylamides.

BACKGROUND

Chemical demulsification is a convenient and effective method in breaking water in oil and oil in water emulsions. Demulsification can be important for waste water handling and volume reduction, food production and processing, and even in chemical manufacturing.

Demulsification may be particularly important in the production of oil and gas for several reasons. One reason is because in the normal course of producing the oil and gas from a subterranean formation, at some point significant amounts of water may be co-produced with the oil and gas. When the water is co-produced as an emulsion, it is usually necessary to break the emulsion prior to transporting the oil to market.

The emulsion may be a natural emulsion due to the presence of naturally occurring emulsifying agents, or the emulsion may be an artifact of the use of additives or other recovery processes. For example, the use of steam and caustic injection or combustion processes, for in-situ recovery of heavy oils, may be complicated by the production of viscous emulsions of oil, water and clay. Crude oil may be found in a geological reservoir in association with gas and saline or fresh formation water. A natural emulsion may form simply due to shear and pressure drops at the well head, chokes and valves.

SUMMARY

In one aspect, the invention is a process for demulsifying a fluid including admixing a fluid and a poly alkylacrylamide wherein the fluid has a hydrocarbon phase and an aqueous phase.

In another aspect, the invention is a process for clarifying water having particulate matter suspended therein including admixing an aqueous suspension of particulate matter with a poly alkylacrylamide.

In still another aspect, the invention is a process for clarifying solids from an organic fluid including admixing the organic fluid and a poly alkylacrylamide.

BRIEF DESCRIPTION OF THE FIGURES

FIG. 1 is a photograph showing testing results from Example 1.

DESCRIPTION

In one embodiment, the method of the disclosure includes admixing a multiphase fluid with an additive comprising a poly alkylacrylamide. In some embodiments, the multiphase fluid has two phases; a hydrocarbon phase and an aqueous phase. In other embodiments, there is a third phase: solids. In still other embodiments, the fluid may be a hydrocarbon phase or an aqueous phase; with solids being the second phase. In a non-limiting embodiment, the fluid does not include a product, such as a carbohydrate product, a tannin product, and mixtures thereof.

In the practice of the method of the application, the multiphase fluid is admixed with a poly alkylacrylamide. These compounds have the general formula:

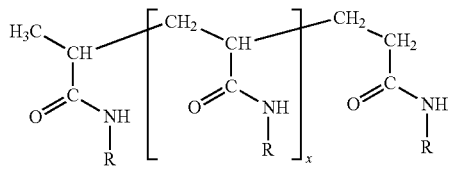

wherein R is an alkyl group having from 3 to about 7 carbons and X is an integer having a value of at least two. In some embodiments the integer has a value of from 2 to about 25,000. In other embodiments the integer has a value of from about 10 to about 1500. The alkyl group may be linear or branched. For example, one polymer useful with the application is a poly isopropylacrylamide. This compound has the general structure:

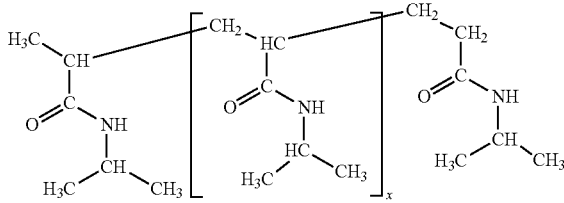

wherein X is as already defined.

In the practice of the method of the disclosure, the poly alkylacrylamide may be a homopolymer, but it also may be copolymerized with one or more co-monomers. For example, in one embodiment, the alkylacrylamide is copolymerized with other monomers to impart other functional groups to improve interfacial interactions. Examples of comonomers which may be useful include, but are not limited to, acrylic acid, tert-butyl acrylamide, acrylamide, N-isopropylacrylamide, 2-acrylamido-2-methyl-1-propanesulfonic acid (AMPS), -methacrylamidopropyltrimethylammonium chloride (MAPTAC), acrylamidopropyltrimethylammonium chloride (APTAC), poly(ethylene glycol) methyl ether acrylate, poly(propylene glycol) methyl ether acrylate, Poly(ethylene glycol) acrylate, undecanoic acid, lauryl acrylate, (3-acrylamidopropyl)trimethylammonium chloride, N,N-dimethylacrylamide, N-(hydroxymethyl)acrylamide, N-hydroxyethyl acrylamide, 2-acrylamidoglycolic acid, 3-acryloylamino-1-propanol, N,N-dimethylacrylamide, N-(isobutoxymethyl)acrylamide, N-[Tris(hydroxymethyl)methyl]acrylamide, N-phenylacrylamide, 2-(diethylamino)ethyl acrylate, 2-ethylhexyl acrylate, 2-hydroxyethyl acrylate, 3-(dimethylamino)propyl acrylate, 4-hydroxybutyl acrylate, di(ethylene glycol) 2-ethylhexyl ether acrylate, [2-(acryloyloxy)ethyl]trimethylammonium chloride, sodium acrylate, 2-(diethylamino)ethyl methacrylate, 2-(dimethylamino)ethyl methacrylate, 2-butoxyethyl methacrylate, 3-(acryloyloxy)-2-hydroxypropyl methacrylate. These additives are copolymerized at ratios of 0.5 wt-% up to 60 wt-%.

For the temperature responsive portion to be active, the poly N-alkylacrylamide may be composed of at least 40 mole % or more of poly-alkylacrylamide. In some examples the poly N-alkylacrylamide may be composed of from about 40 to about 90 mole percent of N-alkylacrylamide. Additives used with the method of the disclosure are introduced into the multiphase fluid at a concentration sufficient to deliver polymer at levels of from about 0.25 to about 10,000 parts per million (ppm). This concentration is based upon the weight of the polymer in the volume of the liquid phases being treated. In some embodiments, the concentration of the polymer will be from about 1.0 to about 1,000 ppm. In still other embodiments, the concentration of the polymer will be from about 10 to about 100 ppm.

In some embodiments, the additive used to treat the multiphase fluid is a neat liquid polymer. In other embodiments, the polymer is dissolved or dispersed in a solvent or carrier fluid. Suitable solvents include, but are not limited to water (acid or base), toluene and mixtures thereof, xylene and mixtures thereof, polyethylene glycol and mixtures thereof, polypropylene glycol and mixtures thereof, hydrocarbon solvents composed of carbon chains of two to twelve carbon atoms (linear or branched) and mixtures thereof.

Some polymers reversibly change conformation in response to a specific external stimulus. For example, almost all polymers undergo some reversible conformational change with changes in solvents. In a marked contrast, other polymers such as poly N-isopropylacrylamide and the other poly N-alkylacrylamides disclosed herein undergo conformational changes in response to temperature changes and other environmental properties such as ionic strength, pH and others. While not wishing to be bound by any theory, it is nonetheless believed that it is the ability of the polymers of the disclosure (at least in part) to undergo these temperature based conformational changes that allow the polymers to act as demulsifiers.

Further, it is believed that the polymer may effect aqueous and hydrocarbon phase separation using at least two mechanisms. The first mechanism is that the molecules interact with the surfaces of the molecules of the non continuous phase, reducing the surface tension and thereby allowing the phases to more easily coalesce.

The second mechanism is that the polymer remains attached to an emulsion interface using functional group substitutions (anionic, hydrophobic, cationic, hydrophilic) present on the polymer chain by way of introduced co-monomers. Upon a change in temperature, for example, such as that occurring when fluid is passing through a heater treater, the bound surfaces are then brought into much closer contact with each other by the change in the length, size or hydrophobicity of the polymer chain resulting in drop coalescence producing resolution of the phases. Additionally, the persistence length (or length in general) of the polymer chains allows the polymer chains to intertwine between the numerous oil or water micelles. Upon contraction of the polymer chains, the micelles can be "corralled" by the contracting chains forcing micelle coalescence. This type of coalescence is in addition to coalescence brought forth by traditional Brownian motion coalescence.

In the practice of the method of the disclosure, the additive is introduced into a multiphase fluid. Any method known to be useful to one of ordinary skill in the art may be employed to introduce the additive. For example, when the multiphase fluid is production fluid passing through a pipe, a static mixer downstream from an injection port may be employed to ensure good mixing of the additive with the multiphase fluid. In the alternative, when the multiphase fluid is in a vessel such as a tank, tanker truck, ship's hold, or the like; the additive may be introduced and admixed with a multiphase fluid by use of a recycled pump. In another embodiment, the additive in a multiphase fluid may be mixed by the shearing effect of fluid passing through a pipe.

Methods used to synthesize the polymers useful with the method of the disclosure include, but are not limited to: emulsion polymerization, microemulsion polymerization, miniemulsion polymerization, solution polymerization, precipitation polymerization, dispersion polymerization, and suspension polymerization. Polymerization methods that can be used to control the type of polymer, either by control of the polydispersity of the molecular weight of the polymer.

Controlled free radical polymerization methods can include, but are not limited to, ATRP (atom transfer radical polymerization), RAFT (reverse addition-fragmentation transfer polymerization), nitroxide-mediated polymerization, iodide-transfer mediated polymerization, anionic polymerization, cationic polymerization, group transfer polymerization, ring-opening polymerization, and step-growth polymerization. In one embodiment, the process is an emulsion polymerization.

In the preparation of aqueous polymer dispersions by emulsion polymerization, distinctions are generally made between batch, semibatch, and continuous processes, and different methods of adding the monomers to the reaction vessel are described. For example, in a semibatch process the monomer emulsion is prepared in a separate batching vessel and the emulsion is passed continuously into a polymerization reactor, where it is polymerized. According to a general procedure for a semibatch process, the emulsion feed stream may comprise all of the ingredients used for the emulsion polymerization, such as monomers, water, and additives, with the aqueous monomer emulsion being prepared in a separate batching vessel, referred to as the feed tank.

In other embodiments, the polymer is prepared by a continuous process or a batch process. In a continuous process, the monomer fed continuously into the reactor while in a batch process; the monomer is reacted without the further addition of monomer. Any method of emulsion polymerization may be used with the method of the disclosure.

The polymer may be prepared using a catalyst or, in the alternative, the polymer may be prepared using thermal energy to initiate polymerization. Any method of catalyzing and/or initiating polymerization of an aqueous dispersion of monomers having one or more polymerizable double bonds may be used with the method of the disclosure. For example, the monomer may be heated to from about 30° C. to about 95° C. to initiate polymerization, or may be conducted at room temperature with the proper initiating system.

In another embodiment of the method of the disclosure, once the polymerization is complete, post-crosslinking of the polymer can be done to make it more effective at demulsification or water clarification. For example, in aqueous reactions, crosslinking can be achieve by copolymerization of the monomers with acrylate or acrylamide monomers composed of at least two vinyl groups capable of polymerizing into the polymer. Examples include N, N' methylenebisacrylamide and variants thereof. Crosslinking in non-aqueous reactions can be achieved with crosslinkers similar to bisacrylamide but can also be achieved via condensation reactions utilizing pendant hydroxyl groups (functional groups that can be present on comonomers) and crosslinkers such as anhydrides (i.e. maleic anhydride, phthalic anhydride), diisocyanates, or epichlorohydrins.

In preparing the polymers useful with the method of the disclosure, it is sometimes necessary to form the emulsion using a mixer or other means of mixing. For example, the monomers may be mixed and then an emulsion maintained using bladed mixers, static mixers, and even nozzle mixers, including solid cone nozzles, hollow cone nozzles, fan jet nozzles, smooth jet nozzles, injector nozzles, ejector nozzles, spiral nozzles, impingement jet nozzles, and two-fluid nozzles or an emulsifying baffle.

When the polymer is prepared using a catalyst, in one embodiment a free-radical catalyst is used. Suitable free-radical polymerization initiators include all those which are capable of setting off a free-radical polymerization. They may comprise either peroxides, e.g., alkali metal peroxodisulfates or organic peroxides, or azo compounds. Use may also be made of combined systems which are composed of at least one organic or inorganic reductant and at least one peroxide and/or hydroperoxide, an example being tert-butyl hydroperoxide with the sodium salt of hydroxymethanesulfonic acid or hydrogen peroxide with ascorbic acid.

Combined catalyst systems may be used which include a small amount of a metal compound which is soluble in the polymerization medium and whose metallic component is able to exist in a plurality of valence states, e.g., ascorbic acid/iron(II) sulfate/hydrogen peroxide, in which in many cases the ascorbic acid may be replaced by the sodium salt of hydroxymethanesulfonic acid, sodium sulfite, sodium hydrogen sulfite or sodium bisulfite and the hydrogen peroxide by tert-butyl hydroperoxide or alkali peroxodisulfates and/or ammonium peroxodisulfate. Another class of initiators are the ammonium or alkali metal salts of peroxosulfates or peroxodisulfates, especially sodium or potassium peroxodisulfate, and V-50* (2,2'-azobis(2-methylpropionamidine) dihydrochloride), an azo initiator. *V-50 is a trade designation of the Wako Company.

The amount of free-radical initiator used, based on the overall amount of the monomers to be polymerized, is, in one embodiment, from 0.1 to 3% by weight. For controlled free radical polymerization, the initiator or catalyst is dependent upon the method. Using ATRP methods of polymerization usually requires the use of metal salts such as, but not limited to, copper bromide. RAFT polymerization is dependent upon the use of a suitable agent for reversible transfer, such as a dithiocarbamate as well as an azo initiator such as AIBN (2,2'-azobis(2-methylpropionitrile). A suitable initiator for an anionic polymerization is sec-butyl lithium, but the method of the disclosure is not limited to this initiator.

Additives may also be used to prepare the polymers useful with the method of the disclosure. One class of additives which may be useful is dispersants. Typical dispersants include emulsifiers and/or protective colloids. These substances are commonly used in amounts of up to 20% by weight in some embodiments, from 0.5 to 15% by weight and in other embodiments, and from 0.5 to 10% by weight in still other embodiments of the invention, based on the weight of the monomers to be polymerized.

Exemplary protective colloids include polyvinyl alcohols, cellulose derivatives, or polymers based on vinylpyrrolidone. Suitable emulsifiers are, in particular, anionic and nonionic emulsifiers, such as ethoxylated mono-, di- and trialkylphenols, ethoxylates of long chain alkanols, alkali metal salts and ammonium salts of alkyl sulfates, of sulfuric monoesters with ethoxylated alkanols and ethoxylated alkylphenols, of alkylsulfonic acids and of alkylarylsulfonic acids.

Nonionic emulsifiers which can be used include arylaliphatic or aliphatic nonionic emulsifiers, examples being ethoxylated mono-, di- and trialkylphenols (degree of ethoxylation: from 3 to 50, alkyl radical: $C_4$-$C_{10}$), ethoxylates of long-chain alcohols (degree of ethoxylation: from 3 to 50, alkyl radical: $C_8$-$C_{36}$), and also polyethylene oxide/polypropylene oxide block polymers.

Examples of suitable anionic emulsifiers are alkali metal salts and ammonium salts of alkyl sulfates (alkyl radical: $C_8$-$C_{12}$), of sulfuric monoesters with ethoxylated alkanols (degree of ethoxylation: from 2 to 50, alkyl radical: $C_{12}$-$C_{18}$) and ethoxylated alkylphenols (degree of ethoxylation: from 3 to 50, alkyl radical: $C_4$-$C_9$), of alkylsulfonic acids (alkyl radical: $C_{12}$-$C_{18}$) and of alkylarylsulfonic acids (alkyl radical: $C_9$-$C_{18}$). Suitable anionic emulsifiers also include bis (phenylsulfonic acid) ethers and their alkali metal salts or ammonium salts.

Suitable cationic emulsifiers for use with the present invention include quaternary ammonium halides, e.g., trimethylcetylammonium chloride, methyltrioctylammonium chloride, benzyltriethylammonium chloride, or quaternary compounds of N—($C_6$-$C_{20}$)alkyl)pyridines, N—($C_6$-$C_{20}$) alkyl morpholines or N—($C_6$-$C_{20}$)alkyl imidazoles, e.g., N-laurylpyridinium chloride.

Another class of additives useful with the invention is chain transfer agents. Chain transfer agents may be useful in some embodiments for controlling molecular weight growth. Optional chain transfer agents include mercaptans such as alkyl and/or aryl alkyl mercaptans. Examples of specific chain transfer agents include n-octyl mercaptan, n-dodecyl mercaptan, t-octyl mercaptan, t-dodecyl mercaptan, tridecyl mercaptan, tetradecyl mercaptan, hexadecyl mercaptan and the like, as well as mixtures thereof.

The polymers useful with the method of the disclosure may have a number average molecular weight (Mn) in the range of at least 400 to 500,000 daltons or more. In one embodiment, the polymer may have a number average molecular weight (Mn) in the range of 1,000 to 100,000 daltons. In still another embodiment, the polymer may have a number average molecular weight (Mn) in the range of 1,500 to 75,000 daltons.

The monomer and dispersant are, in one embodiment, introduced into the water to form an emulsion prior to or concurrent with the initiation of polymerization. When a chemical initiator is used, it may be supplied in a separate stream or admixed concurrently with the monomers in the reactor.

The polymers may be particularly useful in production fluid demulsification and water clarification. For the purposes of this invention, a production fluid is the often multiphase admixture of hydrocarbons, water, soluble inorganic materials and particulate matter produced from an oil and gas well. The polymers useful with the method of the disclosure may be used, optionally in combination with other additives, to treat production fluid downhole, at the surface in a separator, or even down stream from the production well to facilitate the separation of the hydrocarbon from the water in the production fluid to produce a hydrocarbon phase that can be efficiently and cost effectively transferred and refined. In another embodiment, the polymers invention may be used down hole in conjunction with, for example, a descaler, to penetrate and break emulsions in the producing formation to facilitate the flow of hydrocarbons into an oil well bore. The polymers may be used in any way known to those of ordinary skill in the art of producing oil and gas to be useful.

In clarification applications, the polymers useful with the method of the disclosure may be used to clarify process or waste water. In one embodiment, the polymers are admixed with waste water to produce a floc which can then be separated from the water using a separator device. In another embodiment, the polymers may be added to process water to reduce turbidity. The polymers maybe used in any way known to those of ordinary skill in the art of treating process and waste water to be useful.

The polymers of the disclosure may be useful for clarifying solids from organic fluids. The organic fluids may be any hydrocarbon. For example, crude oil, biodiesel, chemical process streams, and/or hydrocarbon solvents.

The polymers of the invention may be used in the form of latexes. In one application, the polymers are prepared by emulsion polymerization. The resultant latex may be used without additional treatment or modification as both a demulsifier and a water clarification agent.

The polymers useful with the method of the application may also be prepared in other solvents besides water. Any solvent known to be useful to those of ordinary skill in the art of preparing polymer and polymers may be used. Examples of such solvents include organic solvents, but are not limited to: polyvinylpyrrolidone, N-methyl-2-pyrrolidinone (also called N-methyl-2-pyrrolidone), 2-pyrrolidone, dimethyl sulfoxide, dimethylacetamide, lactic acid, methanol, ethanol, tetrahydrofuran, isopropanol, 3-pentanol, n-propanol, glycerol, butylene glycol (butanediol), ethylene glycol, propylene glycol, mono- and diacylated monoglycerides (such as glyceryl caprylate), dimethyl isosorbide, acetone, dimethylformamide, 1,4-dioxane, polyethylene glycol (for example, PEG-4, PEG-8, PEG-9, PEG-12, PEG-14, PEG-16, PEG-120, PEG-75, PEG-150) polyethylene glycol esters (examples such as PEG-4 dilaurate, PEG-20 dilaurate, PEG-6 isostearate, PEG-8 palmitostearate, PEG-150 palmitostearate), polyethylene glycol sorbitans (such as PEG-20 sorbitan isostearate), polyethylene glycol monoalkyl ethers (examples such as PEG-3 dimethyl ether, PEG-4 dimethyl ether), polypropylene glycol (PPG), polypropylene alginate, PPG-10 butanediol, PPG-10 methyl glucose ether, PPG-20 methyl glucose ether, PPG-15 stearyl ether, propylene glycol dicaprylate/dicaprate, propylene glycol laurate. Other solvents include saturated aliphatic hydrocarbons such as butane, pentane, hexane and heptane; saturated cycloaliphatic hydrocarbons such as cyclopentane and cyclohexane; monoolefins such as 1-butene and 2-butene; aromatic hydrocarbons such as benzene and toluene; halogenated hydrocarbons such as methylene chloride, chloroform, carbon tetrachloride, trichloroethylene, perchloroethylene, 1,2-dichloroethane, chlorobenzene, bromobenzene and chlorotoluene. Among them, toluene and tetrahydrofuran are preferred. Two or more solvents may be used in combination.

In the processes of the disclosure, fluids may be demulsified and clarified. For the purposes of this disclosure, the term clarifying includes any process for removing solids from a liquid. For example, a process that includes a flocculation step as part of such a process would be within the scope of this term. On the other hand, flocculation is not necessarily required.

EXAMPLES

The following example is provided to illustrate the invention. The examples are not intended to limit the scope of the invention and they should not be so interpreted. Amounts are in weight parts or weight percentages unless otherwise indicated.

Example 1

A demulsifier copolymer composed of N-isopropylacrylamide and 2-acrylamido-2-methyl-1-propanesulfonic acid (70%/20% wt/wt) was treated on a reverse at ~50° C. In bottle A, the control reverse is displayed. In bottle B, the demulsifier composed of components above was injected at 60 ppm (active) and briefly shaken. Clearly the water is significantly clearer than the control. Bottle C is another control. In bottle D, the demulsifier composed of components above was injected at 60 ppm (active) at 25° C. and briefly shaken. The bottle was then heated to 50° C. and shaken. The resultant water is significantly clearer than the control. These experiments show that effective demulsification (clarification) occurs at hot temperatures (though cooler than the 70° C. generally necessary to clarify this fluid) and can be added cool, heated and become effective—a significant advantage over traditional demulsifiers.

In the foregoing specification, the invention has been described with reference to specific embodiments thereof, and has been described as effective in providing processes for demulsifying a fluid by admixing a fluid and a poly alkylacrylamide. However, it will be evident that various modifications and changes can be made thereto without departing from the broader spirit or scope of the invention as set forth in the appended claims. Accordingly, the specification is to be regarded in an illustrative rather than a restrictive sense. For example, specific fluids, poly alkylacrylamides, solvents, and monomers falling within the claimed parameters, but not specifically identified or tried in a particular process, are expected to be within the scope of this invention.

The present invention may suitably comprise, consist or consist essentially of the elements disclosed and may be practiced in the absence of a disclosed element or in the absence of an element not disclosed. For instance, the process may consist of or consist essentially of demulsifying a fluid comprising admixing a fluid and a poly alkylacrylamide; the fluid does not include a product, such as a carbohydrate product, a tannin product, and mixtures thereof; and the fluid has a hydrocarbon phase and an aqueous phase, and the poly alkylacrylamide has the general formula:

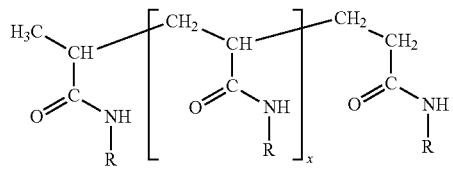

where R is an alkyl group having from 3 to 7 carbons, and X is an integer having a value of at least two.

The words "comprising" and "comprises" as used throughout the claims, are to be interpreted to mean "including but not limited to" and "includes but not limited to", respectively.

What is claimed is:

1. A process for demulsifying a fluid comprising admixing a fluid and a nonionic poly alkylacrylamide; and wherein the fluid comprises a hydrocarbon phase and an aqueous phase and wherein the poly alkylacrylamide has the general formula:

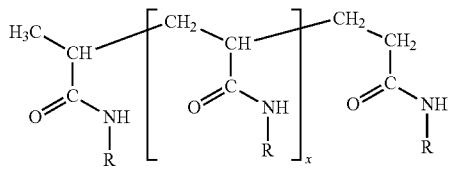

wherein R is an alkyl group having from 3 to 7 carbons and X is an integer having a value of at least two; wherein the nonionic poly alkylacrylamide is formed by copolymerizing an alkylacrylamide monomer with another monomer selected from the group consisting of poly(ethylene glycol) methyl ether acrylate, poly(propylene glycol) methyl ether acrylate, poly(ethylene glycol) acrylate, lauryl acrylate, N,N-dimethylacrylamide, N-(hydroxymethyl)acrylamide, N-hydroxyethyl acrylamide, 3-acryloylamino-1-propanol, N-(isobutoxymethyl)acrylamide, N-[tris(hydroxymethyl)methyl]acrylamide, N-phenylacrylamide, 2-(diethylamino)ethyl acrylate, 2-ethylhexyl acrylate, 2-hydroxyethyl acrylate, 3-(dimethylamino)propyl acrylate, 4-hydroxybutyl acrylate, di(ethylene glycol) 2-ethylhexyl ether acrylate, 2-(diethylamino)ethyl methacrylate, 2-(dimethylamino)ethyl methacrylate, 2-butoxyethyl methacrylate, and 3-(acryloyloxy)-2-hydroxypropyl methacrylate.

2. The process of claim 1, wherein the admixing occurs at a temperature ranging from about 25° C. to about 70° C.

3. The process of claim 1, wherein the fluid is a production fluid.

4. The process of claim 1, wherein the nonionic poly alkylacrylamide is dispersed in a solvent or carrier fluid selected from the group consisting of toluene, xylene, polyethylene glycol, polypropylene glycol, hydrocarbon solvents having carbon chains ranging from two to twelve carbon atoms, and mixtures thereof.

5. The process of claim 1, wherein the nonionic poly alkylacrylamide is in the form of a latex.

6. A process for clarifying water having particulate matter suspended therein comprising admixing an aqueous suspension of particulate matter with a nonionic poly alkylacrylamide wherein the nonionic poly alkylacrylamide has the general formula:

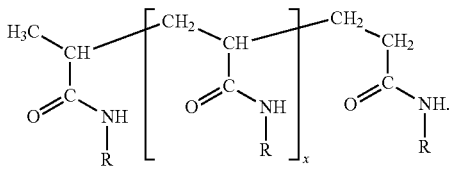

wherein R is an alkyl group having from 3 to about 7 carbons and X is an integer having a value of at least two; and wherein the nonionic poly alkylacrylamide sustains temperature-based changes in its length, size, or hydrophobicity resulting in drop coalescence.

7. The process of claim 6, wherein the admixing occurs at a temperature ranging from about 25° C. to about 70° C.

8. The process of claim 6, wherein the nonionic poly alkylacrylamide is a homopolymer.

9. The process of claim 6, wherein the aqueous suspension of particulate matter does not comprise a product selected from the group consisting of a carbohydrate product, a tannin product, and mixtures thereof.

10. The process of claim 6, wherein the nonionic poly alkylacrylamide is dispersed in a solvent or carrier fluid selected from the group consisting of toluene, xylene, polyethylene glycol, polypropylene glycol, hydrocarbon solvents having carbon chains ranging from two to twelve carbon atoms, and mixtures thereof.

11. The process of claim 6, wherein the nonionic poly alkylacrylamide is in the form of a latex.

12. A process for demulsifying a fluid comprising admixing a fluid and an anionic poly alkylacrylamide; wherein the fluid comprises a hydrocarbon phase and an aqueous phase and wherein the poly alkylacrylamide has the general formula:

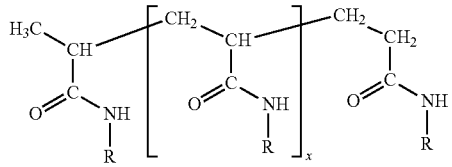

wherein R is an alkyl group having from 3 to 7 carbons and X is an integer having a value of at least two; wherein the anionic poly alkylacrylamide is formed by copolymerizing an alkylacrylamide monomer with an anionic monomer selected from the group consisting of 2-acrylamido-2-methyl-1-propanesulfonic acid (AMPS) and 2-acrylamido-glycolic acid.

13. The process of claim 12, wherein the anionic poly alkylacrylamide is dispersed in a solvent or carrier fluid selected from the group consisting of toluene, xylene, polyethylene glycol, polypropylene glycol, hydrocarbon solvents having carbon chains ranging from two to twelve carbon atoms, and mixtures thereof.

14. The process of claim 12, wherein the anionic poly alkylacrylamide is in the form of a latex.

* * * * *